United States Patent
Zhang (10) Patent No.: US 9,336,462 B2
(45) Date of Patent: May 10, 2016

(54) TRAY-TYPE CARD CONNECTOR CAPABLE OF RECEIVING AT LEAST TWO CARDS SIMULTANEOUSLY

(71) Applicant: HON HAI PRECISION INDUSTRY CO., LTD., New Taipei (TW)

(72) Inventor: Wei-De Zhang, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/465,790

(22) Filed: Aug. 21, 2014

(65) Prior Publication Data

US 2015/0056851 A1    Feb. 26, 2015

(30) Foreign Application Priority Data

Aug. 21, 2013   (CN) .......................... 2013 1 03660812

(51) Int. Cl.
| | | |
|---|---|---|
| H01R 24/00 | (2011.01) | |
| G06K 13/14 | (2006.01) | |
| H01R 13/46 | (2006.01) | |
| H04B 1/3816 | (2015.01) | |
| G06K 7/00 | (2006.01) | |
| H01R 12/71 | (2011.01) | |

(52) U.S. Cl.
CPC .............. *G06K 13/14* (2013.01); *G06K 7/0034* (2013.01); *H01R 13/46* (2013.01); *H04B 1/3816* (2013.01); *H01R 12/714* (2013.01)

(58) Field of Classification Search
CPC .... H01R 12/714; H01R 13/46; H04B 1/3816; G06K 13/14
USPC ........................................ 439/928.1, 630, 527
See application file for complete search history.

(56) References Cited

U.S. PATENT DOCUMENTS

| | | | |
|---|---|---|---|
| 6,241,545 B1 * | 6/2001 | Bricaud et al. ................ | 439/326 |
| 6,805,589 B2 | 10/2004 | Lee | |
| 7,452,241 B2 * | 11/2008 | Kikuchi et al. ............... | 439/630 |
| 8,460,019 B2 * | 6/2013 | Lai ................................ | 439/159 |
| 8,469,747 B2 * | 6/2013 | Huang .......................... | 439/629 |
| 2006/0240713 A1 * | 10/2006 | Kikuchi et al. ............... | 439/630 |
| 2011/0070760 A1 * | 3/2011 | Zhang ........................... | 439/159 |
| 2013/0196523 A1 * | 8/2013 | Lim et al. ...................... | 439/153 |
| 2015/0056851 A1 * | 2/2015 | Zhang ........................... | 439/527 |
| 2015/0079847 A1 * | 3/2015 | Liu et al. ....................... | 439/630 |
| 2015/0155651 A1 * | 6/2015 | Ejiri | |

FOREIGN PATENT DOCUMENTS

| | | |
|---|---|---|
| CN | 202585891 | 12/2012 |
| CN | 203071270 | 7/2013 |

* cited by examiner

*Primary Examiner* — Abdullah Riyami
*Assistant Examiner* — Nelson R Burgos-Guntin
(74) *Attorney, Agent, or Firm* — Wei Te Chung; Ming Chieh Chang (57) ABSTRACT

A card connector (100) used for receiving at least two cards includes an insulative housing (1) having a bottom wall (11), a number of first contacts (21) and a number of second contacts (22) retained in the bottom wall along a front-and-rear direction, a metal shield (4) covering the insulative housing for defining a tray receiving space, and a tray (3) is moveably received in the tray receiving space. The tray includes a first front card receiving cavity (311), a second rear card receiving cavity (312), and a first supporting portion (3112) and a second supporting portion (3121) respectively located below the front card receiving cavity and the rear card receiving cavity. The front card receiving cavity is isolated from the rear card receiving cavity along the front-and-rear direction.

20 Claims, 8 Drawing Sheets

TRAY-TYPE CARD CONNECTOR CAPABLE OF RECEIVING AT LEAST TWO CARDS SIMULTANEOUSLY

BACKGROUND OF THE INVENTION

1. Field of the Invention

The present invention relates generally to a card connector, and more particularly to a tray-type card connector capable of receiving two cards simultaneously.

2. Description of Related Arts

A mobile phone with dual SIM (Subscriber Identity Module) cards is popular to persons who usually work in different cities. Furthermore, so-called smartphones have various functions to meet customers' requirements. For example, an SD card (Secure Digital Memory Card) is used for enlarging storage of the smartphone in addition to a SIM card used for user's identification.

China Pat. No. CN202585891U discloses a card connector including an insulative housing, a plurality of contacts retained in the insulative housing, a metal shield covering the insulative housing for defining a tray receiving space, an ejector assembled on the insulative housing, and a tray moveably received in the tray receiving space to slide on the insulative housing. The tray has only one cavity and only receives one card for electrically connected with the contacts for signal transmission which does not meet customers' requirement of receiving two cards.

China Pat. No. CN203071270U discloses a card connector having a tray for alternatively receiving a SIM card or a micro SD card. The tray has a first receiving space and a second receiving space intersected with each other at a same level. The card connector is not designed to receive two cards at the same time.

U.S. Pat. No. 6,805,589 discloses a card connector having a cartridge seat or tray that can be formed with multiple types of memory card chambers overlapping each other. This card connector further discloses a seat body including a bottom board section and a top board section for receiving respective terminals. This card connector is not designed to receive two cards at a same level at the same time.

A tray-type card connector capable of receiving at least two cards simultaneously is desired.

SUMMARY OF THE INVENTION

Accordingly, an object of the present invention is to provide a tray-type card connector capable of receiving at least two cards simultaneously.

To achieve the above object, a card connector used for receiving at least two cards includes an insulative housing having a bottom wall, a number of first contacts and a number of second contacts retained in the bottom wall along a front-and-rear direction, a metal shield covering the insulative housing for defining a tray receiving space, and a tray is moveably received in the tray receiving space. The tray includes a first front card receiving cavity, a second rear card receiving cavity, and a first supporting portion and a second supporting portion respectively located below the front card receiving cavity and the rear card receiving cavity. The front card receiving cavity is isolated from the rear card receiving cavity along the front-and-rear direction Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1-8, a card connector 100 in a first embodiment of the present invention used for simultaneously receiving a first card 7 and a second card 8, comprises an insulative housing 1, a plurality of contacts 2 retained in the insulative housing 1, a metal shield 4 covering the insulative housing 1 for defining a tray receiving space 10, a tray 3 movably received in the tray receiving space 10 along an insertion/ejection direction, an ejector 5 assembled on the insulative housing 1, and a detecting contact 6 retaining in the insulative housing 1. In the present embodiment, the first card 7 is a micro SIM (Subscriber Identity Module) card and the second card 8 is a nano SIM card. The card connector 100 of the present embodiment is capable of receiving two SIM cards 7, 8 an therefore, the card connector 100 facilitates persons denoting in business who usually work in different cities and usually answer a local telephone in another city.

Figure 3:
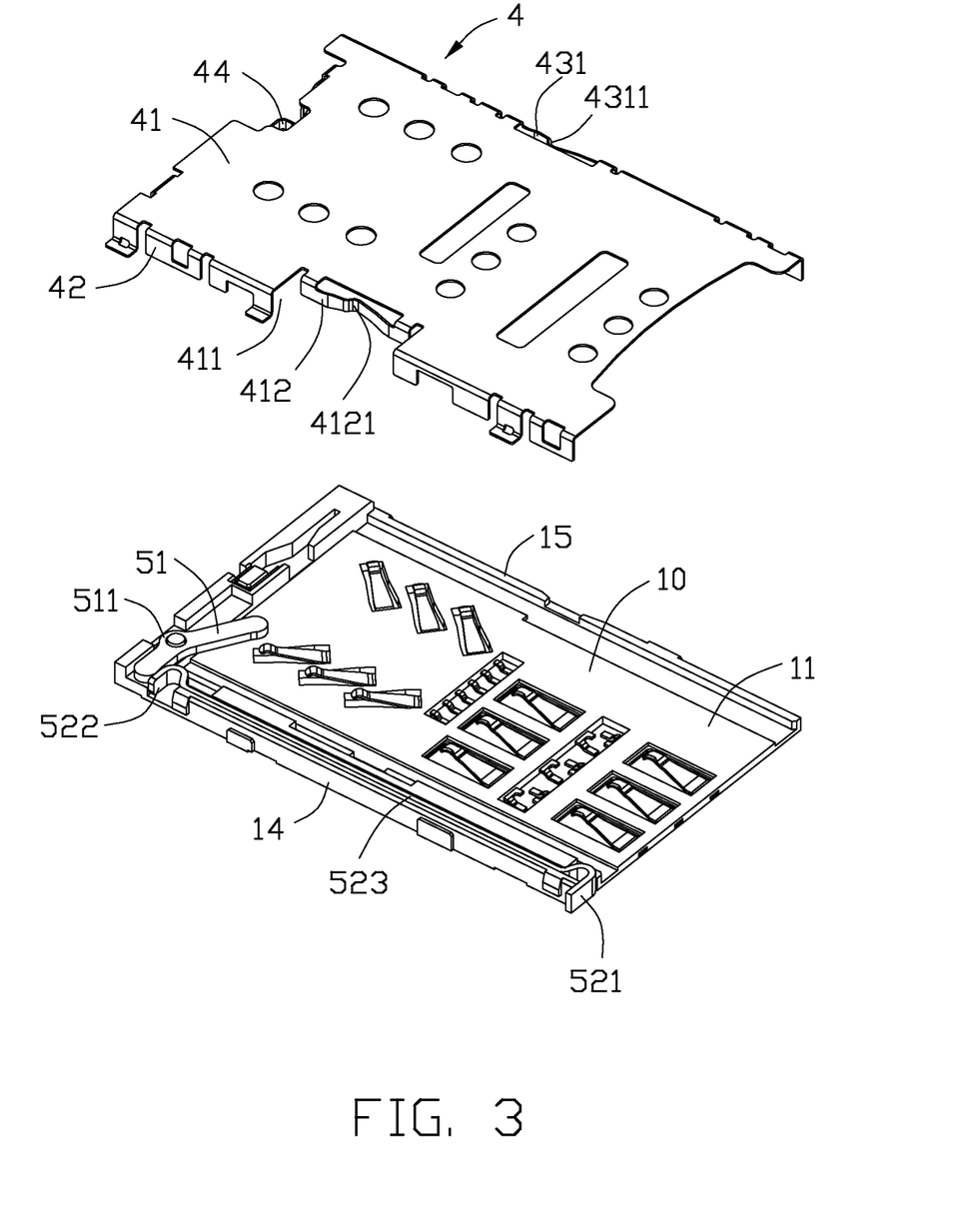
FIG. 3 is a perspective, partly exploded view of FIG. 1 when a metal shield is taken away from other parts thereof.
Figure 4:
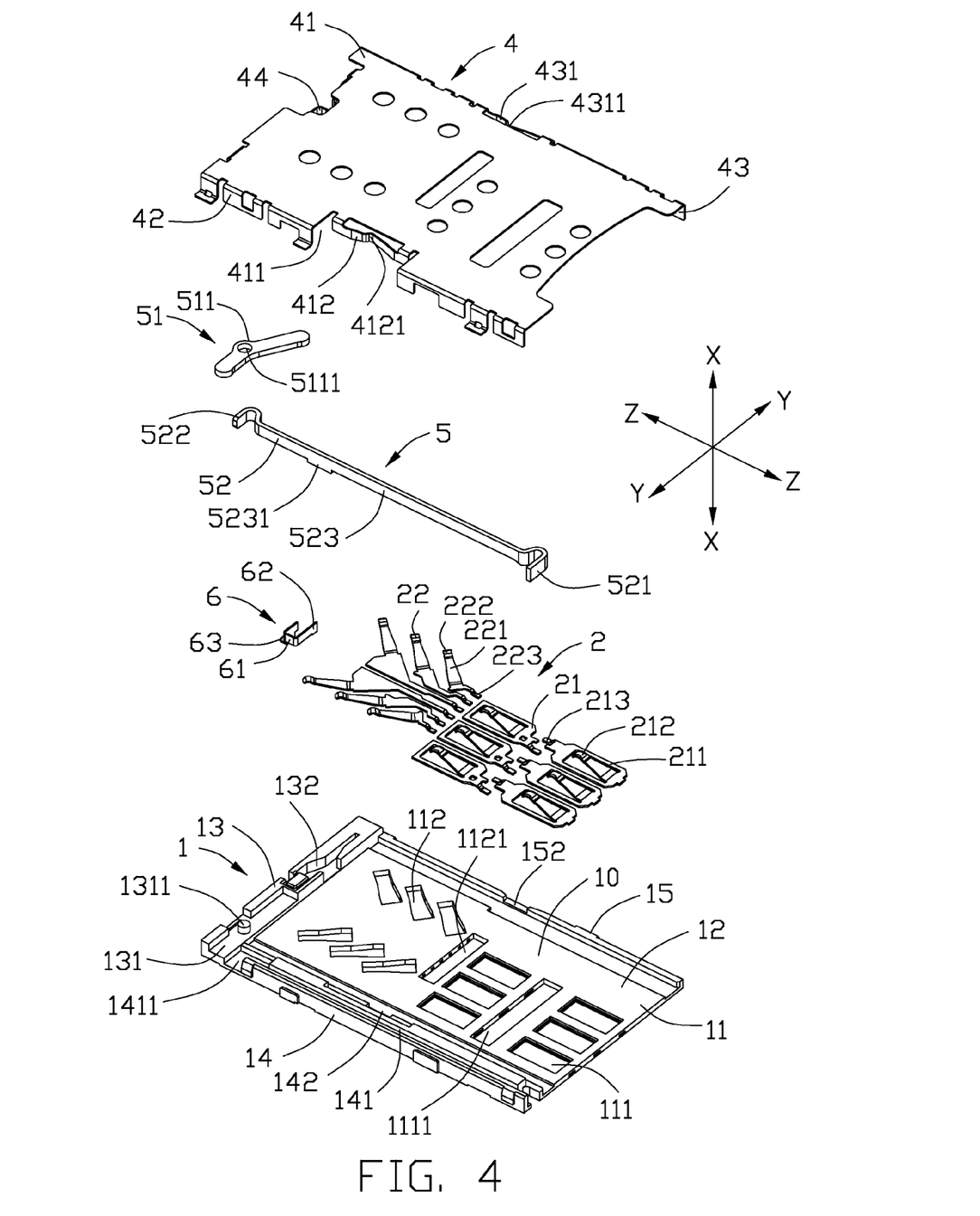
FIG. 4 is a perspective, fully exploded view of the card connector of FIG. 1.

Referring to FIGS. 3 and 4, the insulative housing 1 comprises a bottom wall 11, an insertion opening 12 at a front portion thereof, a rear wall 13 opposite to the insertion opening 12, and a first sidewall 14, a second sidewall 15 vertically extending from two sides of the bottom wall 11. The bottom wall 11 defines a plurality of first passageways 111 adjacent to the front opening 12 and a plurality of second passageways 112 adjacent to the rear wall 13. The first passageways 111 are positioned in two front-and-rear parallel rows and a first transverse slot 1111 is defined between the front-and-rear first passageways 111. The second passageways 112 are positioned in two left-and-right rows and each second passageway 112 slantways extend with respect to both a front-and-rear direction and a left-and-right direction. The front-and-rear direction is parallel with the insertion/ejection direction and the left-and-right direction is perpendicular to the insertion/ejection direction. Generally speaking, the second passageways 112 are positioned at a rear part of the first passageways 111. A second transverse slot 1121 is defined between the first passageways 111 and the second passageways 112 along the insertion/ejection direction. The rear wall 13 defines a channel 131 at a left side thereof for retaining the ejector 5. A post 1311 extends from the rear wall 13 into the channel 131. The rear wall 13 defines a slit 132 at a right side thereof for retaining the detecting contact 6. The first sidewall 14 has a first, left positioned recess 141 and a second, right positioned recess 142 communicating with the tray receiving space 10. The first recess 141 is used for retaining the ejector 5. The first recess 141 comprises a notch 1411 at a rear end thereof and outwardly opened with respect to the tray receiving space 10. The second sidewall 15 comprises a third recess 152 communicating with the tray receiving space 10. The first sidewall 14 and the second sidewall 15 has a plurality of protrusions (not labeled) outwardly extending therefrom for securing with the metal shield 4.

Referring to FIGS. 3-6, the contacts 2 comprises a plurality of first contacts 21 and a plurality of second contacts 22, respectively received in the first passageways 111 and the second passageways 112 of the insulative housing 1. Each first contact 21 comprises a frame portion 211, a first soldering portion 213 extending from an outer edge of the frame portion 211, and a first contacting portion 212 extending rearwardly from an opposite, inner edge of the frame portion 211 to be suspended above the frame portion 211. The frame portions 211 are retained in the insulative housing 1. The first soldering portions 213 of the first contacts 21 are positioned in a single row and the first soldering portions 213 of the front row first contacts 21 and the first soldering portions 213 of the rear row first contacts 21 are alternatively arranged along the left-and-right direction in the first transverse slot 1111 for soldering on a printed circuit board (not shown). The first contacting portions 212 extend into the tray receiving space 10 for contacting with the first SIM card 7. The second contacts 22 comprises a flat base portion 221, a second contacting portion 222 and a second soldering portion 223 oppositely and angularly extending from the base portion 221. The base portions 221 are retained in the insulative housing 1. The second contacting portions 222 extend into the tray receiving space 10 for contacting with the second SIM card 8. The second soldering portions 223 extend in the second transverse slot 1121 for soldering on the printed circuit board. Because the second passageways 112 are spaced to the second transverse slot 1121 for different distances, the second contacts 22 have different lengths for adjusting and adapting the different distances between the second passageways 112 and the second transverse slot 1121. In detail, two of the second contacts 22 in the middle are the longest and the second contacting portions 222 of said two of the second contacts 22 in the middle are the farthest away from the second transverse slot 1121 and while, two of the second contacts 22 at two outer edges are the shortest and the second contacting portions 222 of said two of the second contacts 22 at two outer edges are the nearest to the second transverse slot 1121.

Figure 1:
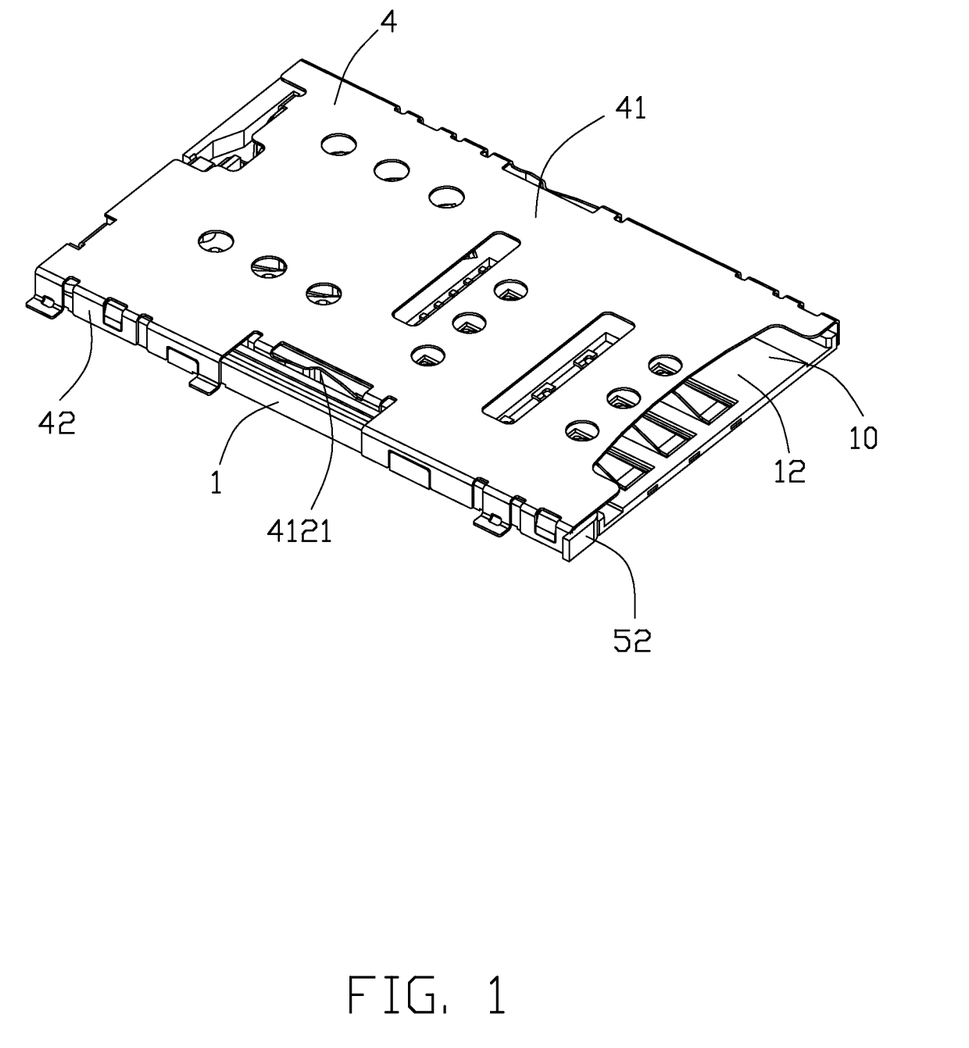
FIG. 1 is a perspective, assembled view of a tray-type card connector constructed in accordance with the present invention but a tray thereof is not shown.
Figure 2:
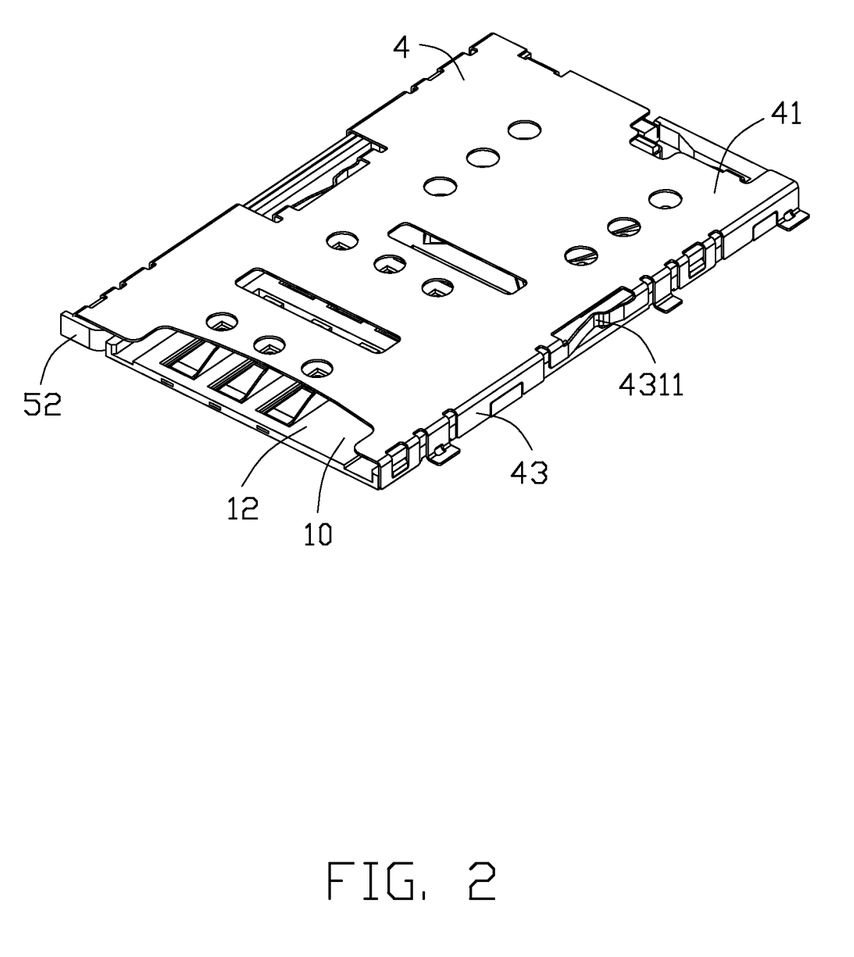
FIG. 2 is similar to FIG. 1, but taken along a different view.

Referring to FIGS. 2-4, the tray 3 comprises a socket portion 31 and a lid portion 32 formed at a front side of the socket portion 31. The socket portion 31 defines a front card receiving cavity 311 and a rear card receiving cavity 312 at a same horizontal plane thereof. In the present embodiment, the front card receiving cavity 311 and the rear card receiving cavity 312 are both defined at a top side of the tray 3. The front card receiving cavity 311 is isolated from the rear card receiving cavity 312 by a division portion 313. The front card receiving cavity 311 is located nearer to the lid portion 32 than the rear card receiving cavity 312. The front card receiving cavity 311 is used for receiving the first SIM card 7 and the rear card receiving cavity 312 is used for receiving the second SIM card 8. Therefore, the front card receiving cavity 311 is larger than the rear card receiving cavity 312. The front card receiving cavity 311 has a length along the front-and-rear direction and a width along the left-and-right direction. The rear card receiving cavity 312 has a length along the left-and-right direction and a width along the front-and-rear direction. Namely, the front card receiving cavity 311 is perpendicular to the rear card receiving cavity 312 in consideration of their extensions. The socket portion 31 has a first cut portion 3111 extending into the front card receiving cavity 311 for correct placement of the first SIM card 7. The division portion 313 comprises a second cut portion 3131 extending into the rear card receiving cavity 312 for correct placement of the second SIM card 8. In the present embodiment, the first cut portion 3111 and the second cut portion 3131 are diagonally disposed. The socket portion 31 has a first supporting portion 3112 and a second supporting portion 3121 respectively located below the front card receiving cavity 311 and the rear card receiving cavity 312 for respectively supporting the first SIM card 7 and the second SIM card 8. The socket portion 31 has a pair of guided portions 314 extending outwardly therefrom to be located at two lateral sides of the front card receiving cavity 311 for guiding insertion of the tray 3. Each guided portion 314 defines a gap 3141. The gaps 3141 are substantially located at a middle part of the socket portion 31 and adjacent to the division portion 313. The lid portion 32 defines a round hole 321 exposed at a side of the socket portion 31.

Referring to FIGS. 2-6, the metal shield 4 comprises a main portion 41 and a first lateral wall 42, a second lateral wall 43 bending vertically from two edges of the main portion 41. The metal shield 4 comprises a first spring beam 412 vertically extending along the front-and-rear direction as the first lateral wall 42 and spacing inwardly away from the first lateral wall 42. The second lateral wall 43 also comprises a second spring beam 431. Both ends of each spring beam 412, 431 are connected to the main portion 41. Each spring beam 412, 431 have a curved portion 4121, 4311 protruding inwardly towards the tray receiving space 10. The curved portions 4121, 4311 are used for engaging with the gaps 3141 of the tray so as to secure the tray 3 in the tray receiving space 10. When the metal shield 4 is assembled on the insulative housing 1, the first lateral wall 42 and the second lateral wall 43 are secured to the sidewall 12 of the insulative housing 1 via said protrusions of the insulative housing 1. The first spring beam 412 is received in the second recesses 142. When the tray 3 is fully inserted in the tray receiving space 10, the first spring beam 412 and the second spring beam 431 are secured into the gaps 3141 for preventing the tray 3 from accidently dropping from the tray receiving space 10. The metal shield 4 comprises a detecting beam 44 at a rear part thereof. The detecting beam 44 originally contacts with the detecting contact 6 and detaches away from the detecting contact 6 for detecting full insertion of the tray 3 in the tray receiving space 10.

Referring to FIGS. 2-6, the ejector 5 comprises an operating portion 52 and an actuating portion 51 actuated by the operating portion 52 for ejecting the tray 3 out of the tray receiving space 10. The actuating portion 51 comprises a first arm, a second arm and a pivoting portion 511 connecting with the first arm and the second arm. The pivoting portion 511 defines a pivoting hole 5111. The post 1311 is received in the pivoting hole 5111 and therefore, the actuating portion 51 is assembled on the insulative housing 1 and pivotally movable in the channel 131 around the post 1311. The operating portion 52 comprises a first curved hook portion 521, a second curved hook portion 522, and a linear connection bar 523 connecting the first curved hook portion 521 and the second curved hook portion 522. The linear connection bar 523 is movably received in the first, left positioned recess 141, the second curved hook portion 522 is exposed in the notch 1411, and the first curved hook portion 521 extends out of the insulative housing 1 to in alignment with the round hole 321 of the tray 3.

Figure 5:
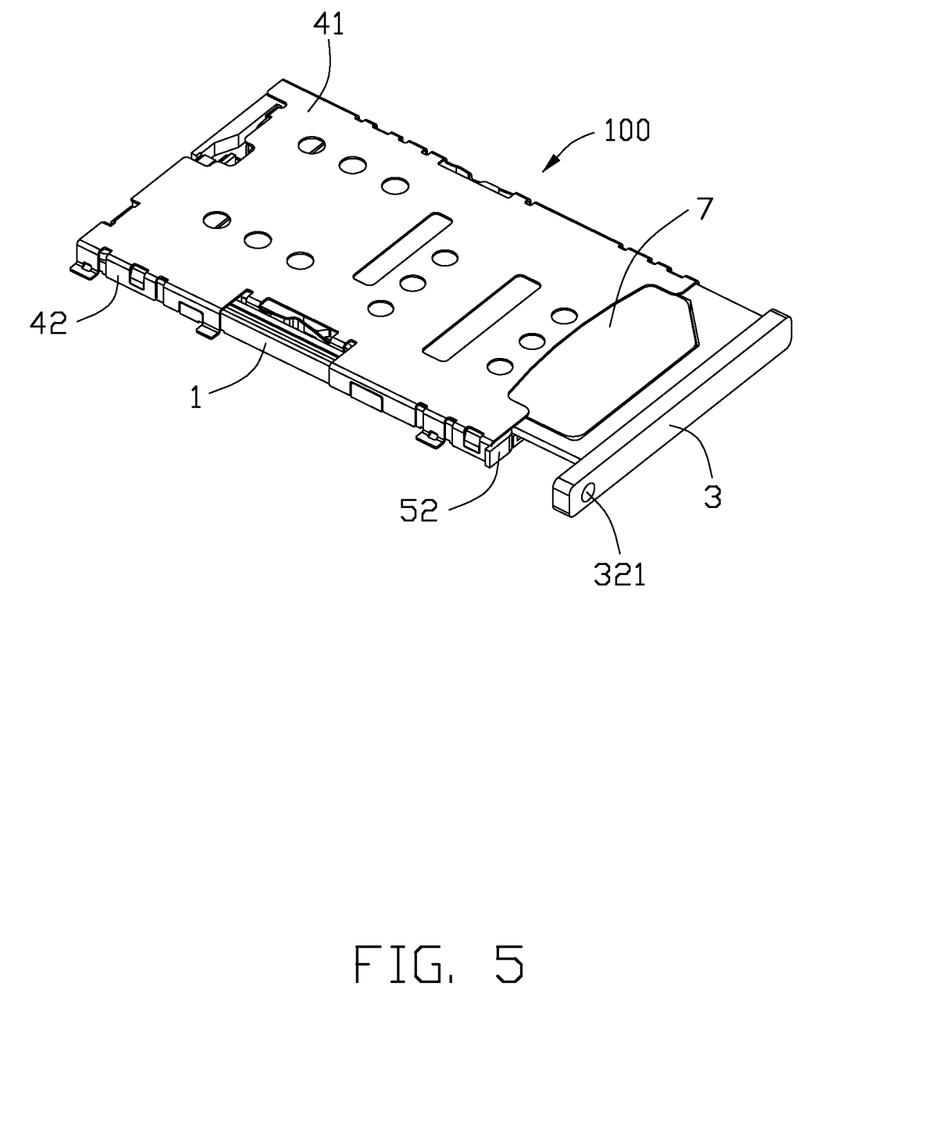
FIG. 5 is a perspective, assembled view of the card connector when the tray is inserted therein.
Figure 6:
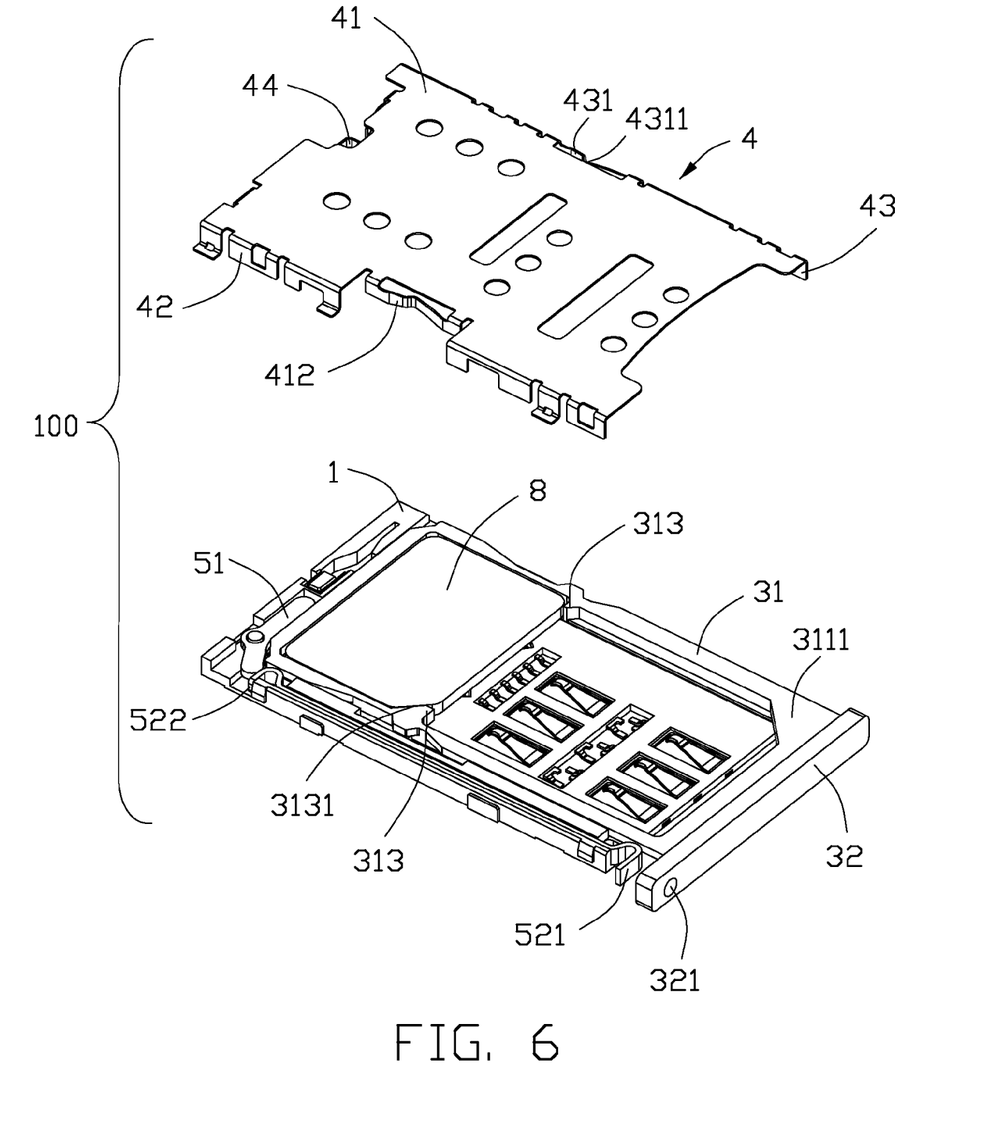
FIG. 6 is similar to FIG. 2 wherein a first card is received in the tray.
Figure 7:
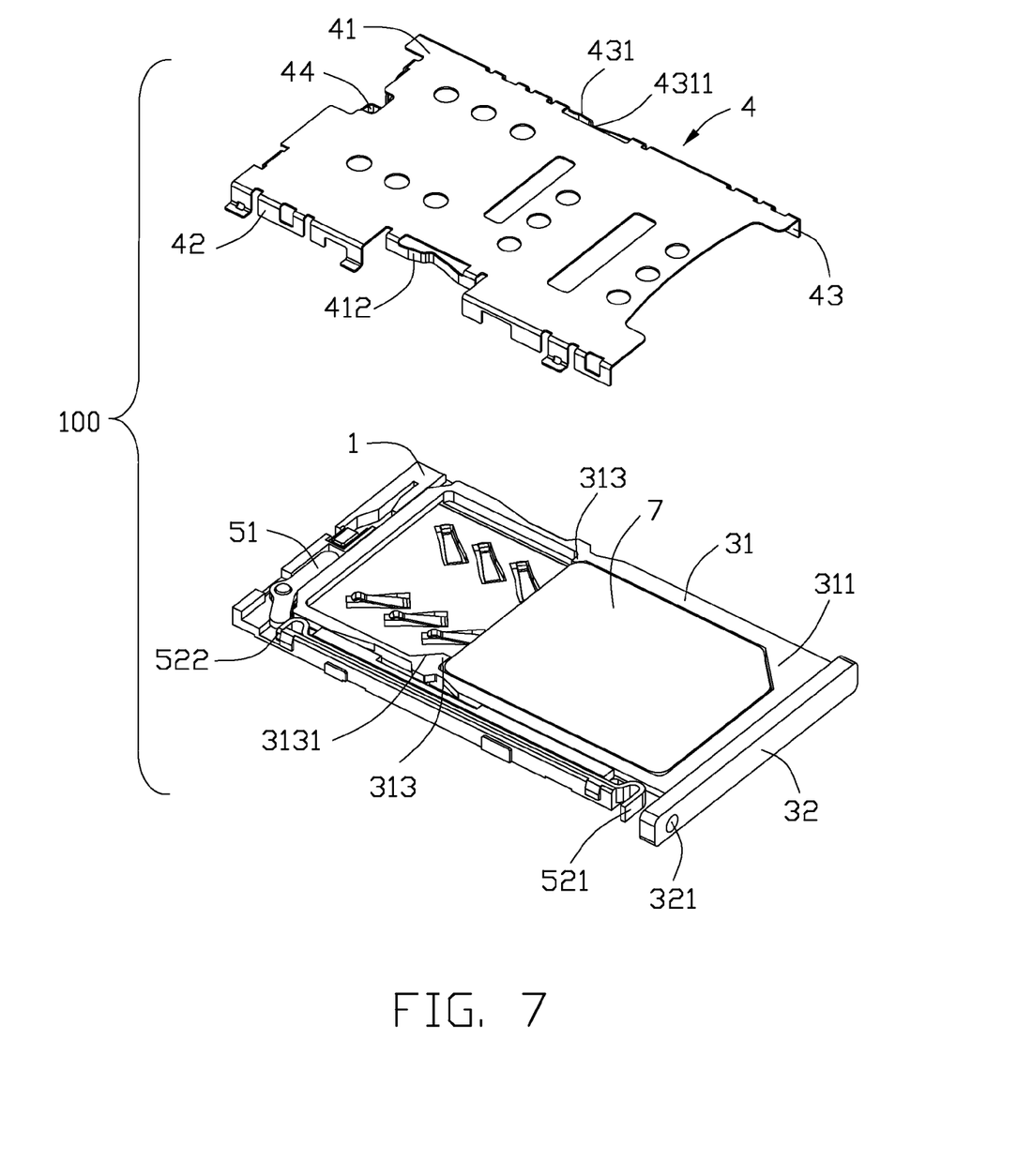
FIG. 7 is similar to FIG. 2 wherein a second card is received in the tray.
Figure 8:
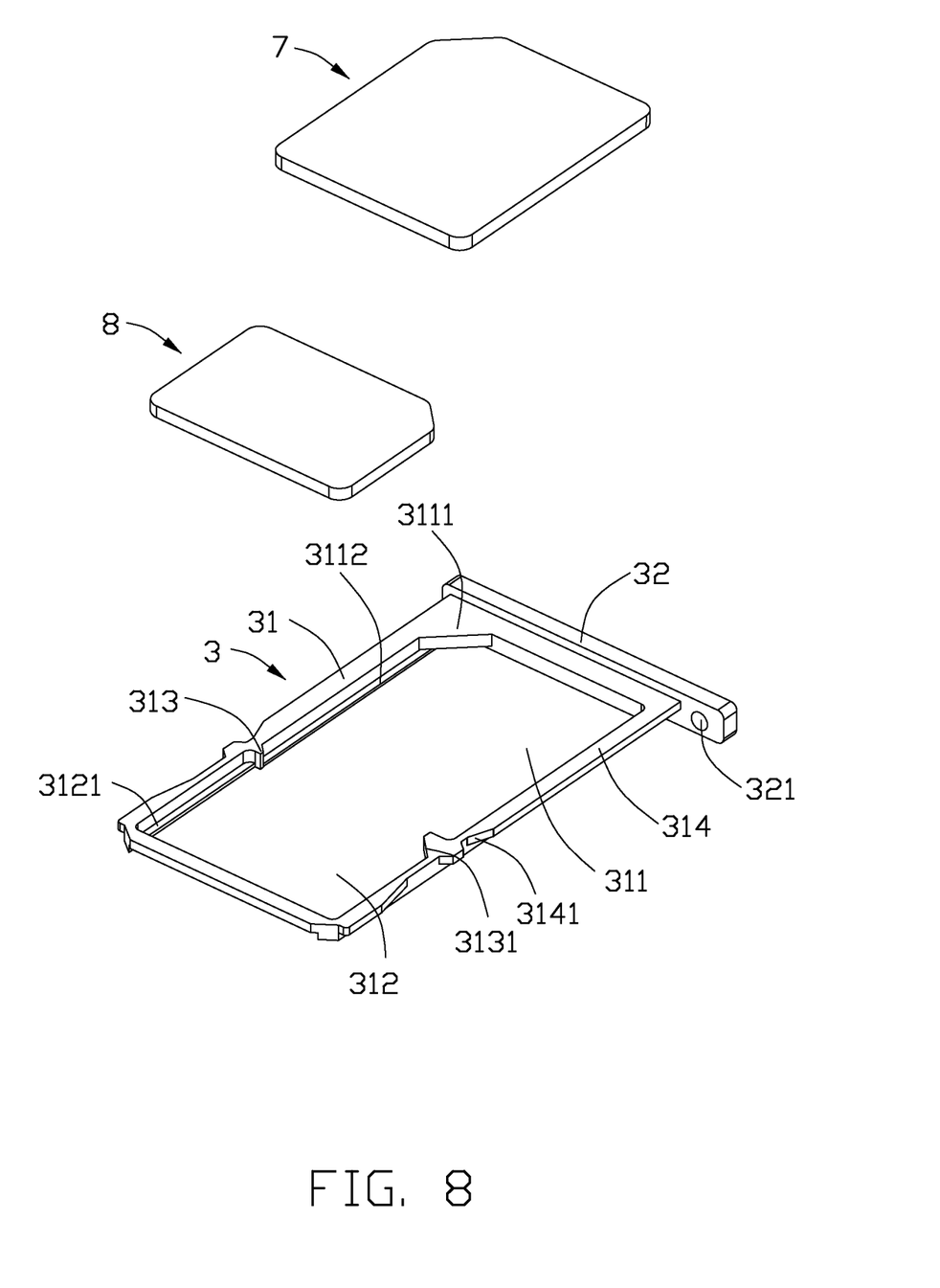
FIG. 8 is a perspective, exploded view of the tray, and the received first card, second card.

Referring to FIGS. 5 and 6, the detecting contact 6 comprises a U-shaped retaining portion 61. The U-shaped retaining portion 61 is laid flat in a horizontal plane so that the detecting contact 6 has a front arm portion 62 vertically extending to originally, electrically connect with the detecting beam 44 of the metal shield 4. The detecting contact 6 has a third soldering portion 63 horizontally, rearwardly extends from a bottom edge of a rear arm portion which is oppose to the front arm portion 62. The detecting contact 6 is retained in the slit 132 of the insulative housing 1. Therefore, the front arm portion 62 originally connects with the detecting beam 44 and is deflected to detach away from the detecting beam 44 when the tray 3 is fully inserted in the tray receiving space 10 for detecting insertion of the tray 3.

In the first embodiment of the card connector 100, the tray 3 has two cavities (the front card receiving cavity 311 and the rear card receiving cavity 312) to simultaneously receive two SIM cards, and therefore, the card connector 100 facilitates the user to answer different local telephones in different cities. In a second embodiment, one of the front card receiving cavity 311 and the rear card receiving cavity 312 is changed into a micro SD card receiving cavity and therefore, the card connector 100 is capable of simultaneously receiving a SIM card and a micro SD card, and therefore, the card connector 100 is used for both user's identification and storage enlargement. Furthermore, in a third embodiment, the card connector has total three cavities including of both two SIM card cavities and a micro SD card cavity, and therefore, the card connector 100 simultaneously facilitates the user to answer different local telephones in different cities and enlarges its storage. The front card receiving cavity 311 and the rear card receiving cavity 312 have same card assembling accesses and respectively face to the first contacts 21 and the second contacts 22 both on the bottom wall 11 via a window portion. The window portion is defined by the inner edges of the first and second supporting portion 33112, 3121. Understandably, the totally separated type front card receiving cavity 311 and the rear card receiving cavity 312 may advantageously have the corresponding card not improperly invade the unrelated card receiving cavity to interfere with the unrelated contacts therein.

In an alternative embodiment which is different from the first embodiment at: the insulative housing 1 comprises a top wall (not shown), a bottom wall 11, a rear wall 13, and a pair of sidewalls 14, 15 cooperatively defining a tray receiving space 10 with an insertion opening 12 at a front side thereof which is opposite to the rear wall 13. The first contacts 21 are retained in the top wall and the second contacts 22 are retained in the bottom wall 11. The tray 3 is moveably inserted into the tray receiving space 10. The tray 3 defines an upper card receiving cavity 31 and a lower card receiving cavity 32 isolated from each other along a vertical direction perpendicular to the front-and-rear direction. The upper card receiving cavity 31 and the lower card receiving cavity 32 have opposite card assembling accesses and respectively face to the first contacts 21 on the top wall and the second contacts 22 on the bottom wall 11. The lower card receiving cavity 32 has additional clamping portion to prevent the card received in the lower card receiving cavity 32 from dropping therefrom. Alternatively, the upper card receiving cavity 31 and the lower card receiving cavity 32 have same card assembling accesses. The upper card receiving cavity 31 directly faces towards the first contacts 21. The tray 3 further has a window portion to allow the lower card receiving cavity 32 to face towards the second contacts 22 on the bottom wall 11. The tray 3 of the card connector 100 in the alternative embodiment has two cavities to simultaneously receive two cards, too.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector used for receiving at least two cards, comprising:
    an insulative housing having a bottom wall;
    a plurality of first contacts and a plurality of second contacts retained in the bottom wall along a front-and-rear direction, each of said first contacts and said second contacts including a contacting portion and a soldering portion;
    a metal shield covering the insulative housing for defining a tray receiving space; and
    a tray moveably received in the tray receiving space, the tray comprising a first front card receiving cavity, a second rear card receiving cavity, and a first supporting portion and a second supporting portion respectively located below the front card receiving cavity and the rear card receiving cavity, the front card receiving cavity and the rear card receiving cavity respectively facing to the first contacts and the second contacts via a window portion which is defined by inner edges of the first and second supporting portions; wherein
    the front card receiving cavity is isolated from the rear card receiving cavity along the front-and-rear direction without overlapping;
    wherein both the soldering portions of the first contacts and those of the second contacts are located in the first supporting portion and upwardly exposed toward the first receiving cavity via two corresponding transverse slots respectively formed in the first supporting portion.

2. The card connector as claimed in claim 1, wherein the front card receiving cavity is perpendicular to the rear card receiving cavity in consideration of their extensions.

3. The card connector as claimed in claim 2, wherein the front card receiving cavity has a length along the front-and-rear direction and a width along a left-and-right direction perpendicular to the front-and rear direction, and the rear card receiving cavity has a length along the left-and-right direction and a width along the front-and-rear direction.

4. The card connector as claimed in claim 1, wherein the tray has a first cut portion extending into the front card receiving cavity for correct placement of a first card and a second cut portion extending into the rear card receiving cavity for correct placement of a second card, and the first cut portion and the second cut portion are diagonally disposed.

5. The card connector as claimed in claim 1, wherein the front card receiving cavity and the rear card receiving cavity have same card assembling accesses.

6. The card connector as claimed in claim 1, wherein the tray has a pair of guided portions located at two lateral sides of the front card receiving cavity for guiding insertion of the tray.

7. The card connector as claimed in claim 6, wherein each guided portion defines a gap substantially located at a middle part of the tray.

8. The card connector as claimed in claim 7, wherein the metal shield comprises a pair of spring beams each having a curved portion protruding inwardly towards the tray receiving space and engaging with the gaps of the tray so as to secure the tray in the tray receiving space.

9. A card connector used for receiving a card, comprising:
    an insulative housing having a top wall, a bottom wall, a rear wall, and a pair of sidewalls cooperatively defining a tray receiving space;

a plurality of first contacts retained on the top wall and a plurality of second contacts retained on the bottom wall; and a tray moveably received in the tray receiving space along a front-and-rear direction, the tray comprising a first upper card receiving cavity and a second lower card receiving cavity respectively facing to the first contacts and the second contacts; wherein the first upper card receiving cavity is isolated from the second lower card receiving cavity without overlapping along a vertical direction perpendicular to the front-and-rear direction;

wherein each of said first contacts and said second contacts includes a contacting portion extending toward the corresponding one of the first upper card receiving cavity and the second lower card receiving cavity, and a soldering portion located in a first supporting portion located under said first upper card receiving cavity and exposed upwardly toward the first upper card receiving cavity via a corresponding transverse slot formed in the first supporting portion.

10. The card connector as claimed in claim 9, wherein the upper card receiving cavity and the lower card receiving cavity have opposite card assembling accesses and the lower card receiving cavity has a clamping portion to prevent the card received in the lower card receiving cavity from dropping.

11. The card connector as claimed in claim 9, wherein the upper card receiving cavity and the lower card receiving cavity have same card assembling accesses, the upper card receiving cavity directly faces the first contacts, and the tray has a window portion to allow the lower card receiving cavity to face the second contacts on the bottom wall.

12. An electronic card connector assembly comprising:
an insulative housing defining a neighboring front region and rear region along a front-to-back direction with a tray receiving space therein;
a plurality of first contacts disposed in said front region with contacting sections upwardly extending into the tray receiving space;
a plurality of second contacts disposed in said rear region with contacting sections upwardly extending into the tray receiving space;
a frame like card tray horizontally moveably received within the tray receiving space, said card tray defining first and second card receiving cavities therein corresponding to the front region and the second region for receiving corresponding first card and second card, respectively, wherein said first card and said second card have different configurations and sizes from each other, said first card receiving cavity and said second card receiving cavity being separated from each other without overlapping so as to allow both the first card and the second card mechanically received within the card tray simultaneously without interference regardless of whether both of said first card and said second card operate electrically; wherein each of said first contacts further includes a first soldering portion and each of said second contacts further includes a second soldering portion, and both said first soldering portion of said first contacts and said second soldering portion of said second contacts are located in only a same one of said front region and said rear region and upwardly exposed to the same corresponding one of said first and second card receiving cavities via respectively two different transverse slot formed in said same one of said front region and said rear region.

13. The electronic card connector as claimed in claim 12, wherein one of said first card receiving cavity and said second card receiving cavity essentially forms a first rectangular configuration with a first long side extending along a transverse direction perpendicular to said front-to-back direction, and a first short side extending along the front-to-back direction while the other of said first card receiving cavity and said second card receiving cavity essentially forms a second rectangular configuration with a second long side extending along the front-to-back direction and a second short side extending along the transverse direction.

14. The electronic card connector as claimed in claim 13, wherein said first card receiving cavity forms said first rectangular configuration and said second card receiving cavity forms said second rectangular configuration.

15. The electronic card connector as claimed in claim 14, wherein said second rectangular configuration is larger than said first rectangular configuration.

16. The electronic card connector as claimed in claim 14, wherein the first long side is larger than the second short side.

17. The electronic card connector as claimed in claim 14, wherein the contacting section of the first contact extends obliquely in a top view.

18. The electronic card connector as claimed in claim 12, wherein the first card receiving cavity defines a first chamfered structure for orientation of the first card, and the second card receiving cavity defines a second chamfered structure, for orientation of the second card, which is spaced from said first chamfered structure with a length of said second long side along said front-to-back direction.

19. The electronic card connector as claimed in claim 12, wherein said card tray is moveable along the front-to-back direction rather than a transverse direction perpendicular to said front-to-back direction.

20. The electronic card connector as claimed in claim 12, wherein the first card receiving cavity defines a chamfered structure for orientation of the first card, and the card tray forms a notch in a side edge adjacent to said chamfered structure to cooperate with a spring beam formed on a metallic shell assembled upon the housing.

\* \* \* \* \*